Sept. 22, 1964          H. S. PATTIN          3,150,009
                         GALVANIC BATTERY
                        Filed May 19, 1961
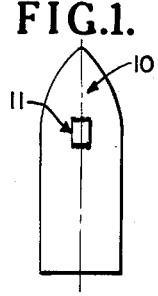
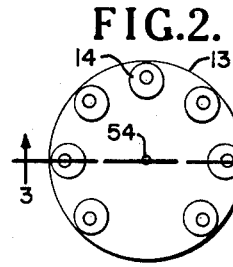
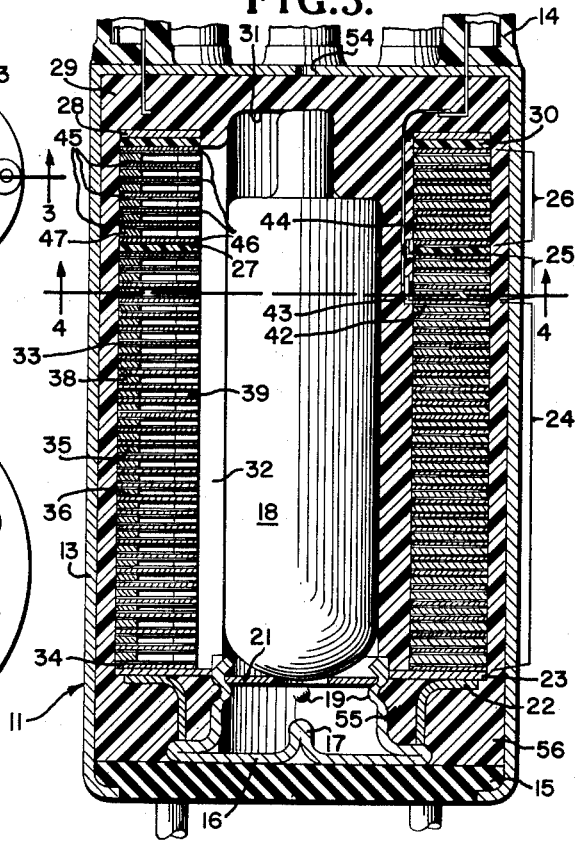
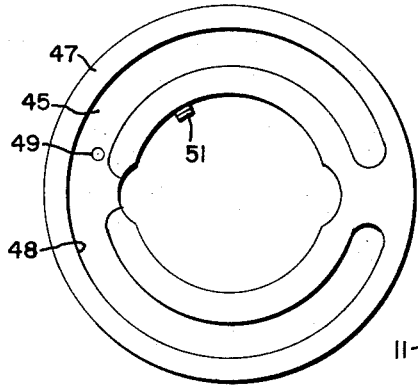
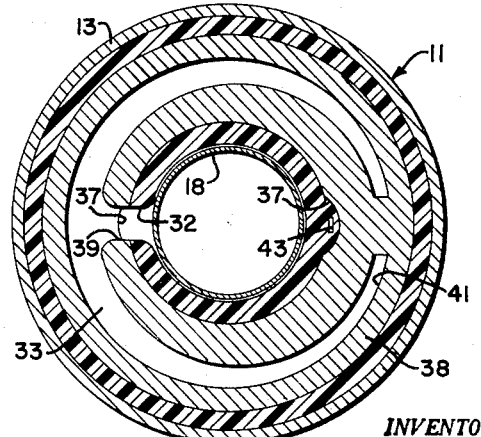
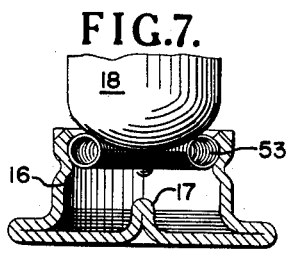
INVENTOR.
HOWARD S. PATTIN
BY W. O. Quesenberry
   O. K. Hodges
             ATTYS.

United States Patent Office 3,150,009
Patented Sept. 22, 1964

3,150,009
GALVANIC BATTERY
Howard S. Pattin, Lakewood, Ohio, assignor, by mesne assignments, to the United States of America as represented by the Secretary of the Navy
Filed May 19, 1961, Ser. No. 111,407
8 Claims. (Cl. 136—90)

This invention relates generally to an improved electrochemical battery and more particularly to a new and improved arrangement in the various cell locations in a force-filled reserve energizer utilized as a power source for a proximity fuze located within a projectile.

In the field of reserve energizers, it has been the general practice to construct the energizer by positioning the C section adjacent the A section such that, from one end of the cell stack, the energizer was made up of a multiple cell series connected B section adjacent to which was placed a multiple cell, parallel connected A section. Abutting the opposite end of the A section was stacked a multiple cell, series connected C section. With this arrangement no insulating barriers between the A, B, and C sections were required.

As long as the set-back and spin forces are of sufficient magnitude to give complete fragmentation of the ampule, the C section in the uppermost section of the energizer would receive, by splash filling, sufficient electrolyte to supply a fuze biasing load. In normal operation of a spin-filled battery or energizer, the unit fills with electrolyte, one cell at a time, from one end of the stack, with the exception of the small amount of electrolyte deposited in the individual cells by splash filling at the time the ampule is broken. If splash filling of the C section does not occur, little or no electrolyte can reach the C section by flowing across the larger cells of the A section since the A section serves not only for power producing purposes but also as a reservoir to accommodate the excess electrolyte eventuating from the B section filling. For this reason, in certain field artillery and rocket application where the set-back forces are low or entirely absent, ampule fragmentation may not be complete, thus leaving a glass bell within the ampule cavity which prevents the C section, when placed above the A section, from receiving electrolyte on normal spin distribution or from splashing, thereby creating a malfunction of the projectile in the field.

The general purpose of this invention is to provide an electro-chemical energizer or battery, for use in a projectile, which embraces all the advantages of similarly employed spin-filled batteries and possesses none of the afore described disadvantages.

To attain this, the present invention contemplates a spin-filled, electro-chemical energizer in which a unique arrangement of the cell sections is employed whereby adequate filling of each section is insured.

An object of the invention is to provide a battery or reserve energizer for use as a power source in a proximity fuzing system for a projectile.

Another object is to provide a power source for a proximity fuze in a projectile and which is rendered effective by a relatively low set-back force.

A further object of the invention is to provide a battery or reserve energizer which insures distribution of the electrolyte among the various cells when incomplete fragmentation of the ampule occurs.

Still another object is to provide a new and unique cell arrangement within a force-filled electro-chemical battery.

Other objects and many of the attendant advantages of this invention will be more readily appreciated as the same becomes better understood by reference to the following detailed description when considered in connection with the accompanying drawings in which like reference numerals designate like parts throughout the figures thereof and wherein:

FIG. 1 illustrates a projectile in flight containing a reserve energizer employing the present invention;

FIG. 2 is a plan view of a preferred embodiment of the invention;

FIG. 3 is a section of the device taken on the line 3—3 of FIG. 2;

FIG. 4 is a section of the preferred embodiment taken on the line 4—4 of FIG. 3 looking in the direction of the arrows;

FIG. 5 is a plan view of one coated steel shim with the paper separator in place before assembly in the A section;

FIG. 6 is a plan view of a second coated steel shim without the paper separator and before assembly in the A section; and FIG. 7 is a partial detail view of FIG. 3 illustrating another embodiment of the ampule support means.

There is illustrated in FIG. 1 a projectile generally indicated by the numeral 10 within which is contained an electro-chemical battery or reserve energizer of cylindrical configuration 11, the axis of which is coincident with the spin axis of the projectile. It is to be understood that the angle of flight of the projectile may be at any angle to the horizon and that the spin of the projectile may be in either direction.

Also within the projectile, but not shown, is a proximity fuzing system or any other electrical equipment requiring a suitable power source of the type herein disclosed.

FIG. 2 illustrates a plan view of the reserve energizer that comprises a battery casing 13 which is castellated to form a plurality of terminal means 14 to provide for suitable connections to the electrical equipment contained within the projectile. The connector means may be of any suitable type, such as plug-in connectors.

The section of FIG. 3 is taken along the line 3–3 of FIG. 2 and illustrates the battery or reserve energizer in detail.

There is illustrated in FIG. 3 the battery case 13 and a base member 15 composed of "Plaskon" or other suitable molding compound. A breaker platform 16 is supported by the base member 15 and has an impression 17 therein for insuring fragmentation of the electrolyte containing ampule 18 as will hereinafter become more readily understood as the description proceeds.

The breaker platform also has a friction contact means 19 which holds an ampule support disk 21 in position above the base of the platform. The friction contact means 19 and the ampule support disk 21 are so arranged that the frictional forces there between are sufficient to maintain the ampule supported above the platform breaker during normal handling and shipping but are insufficient to support the ampule under the set-back forces which occur on firing of the projectile.

Carried by the breaker platform 16 is a stack support 22 and a cell support disk 23. The breaker platform 16, the stack support 22 and the cell support disk 23 are each constructed of steel or other suitable electrical conducting material and may be plated with silver, cadmium, or the like, to insure good electrical contact therebetween for reasons which will hereinafter become more clearly apparent.

Supported by the cell support disk 23 are a plurality of series connected cells 24 which may be of any number depending on the desired voltage and constitute the high voltage B section of the battery 11. Adjacent the B section is another plurality of series connected cells 25 of any desired number which constitute the grid bias C section of the reserve energizer or battery 11.

Above the C section, as viewed in FIG. 3, is located a plurality of parallel connected cells 26 of any desired number and comprising the filament heater A section of the energizer 11. Interposed between the C section and the A section is an insulating and reinforcing washer 27 which insulates the series connected C section from the parallel connected A section and further provides for additional support to prevent warping of the individual cells.

Adjacent the upper cell of the A section is an insulating washer 30 composed of "Vinylite" or other suitable material and a stack height adjusting device 28 such as a steel washer which can be fabricated to any desired thickness. The height adjusting device, may of course, be omitted or may comprise a plurality of washers, as the case may be, in order to obtain the desired stack height.

The cells comprising the A, B, and C sections are assembled by stacking the plate 33 and the separators 38 in alternate order in a single stacking operation after which an elastomeric molding compound 29 is applied to and completely encloses the entire cell stack except for an ampule cavity 31 and a fill channel 32 interconnecting the various active cell elements, and may be of "Vinylite" base or any other compound compatible with the electrode coatings from the standpoint of contamination. The stack may be incapsulated by the folding compound using any suitable operation, as will hereinafter be set forth in greater detail.

The battery 11 utilizes annular-shaped plates 33 of electrically conducting material, stacked at a right angle to the unit axis. The first plate 34 in the B section is coated with a nickel surface on the side abutting the cell support disk 23 and a lead dioxide coating on the other surface thereof. Each of the other annular-shaped plates 33, which comprise the B and C sections, is coated with lead on one flat surface thereof, as at 35, and a lead dioxide coating 36 on the other flat surface. The annular plates 33 of the B and C sections are stacked in such a manner as to place the lead coated surface 35 on one plate facing the lead dioxide coating 36 of the next adjoining plate.

The annular-shaped plates 33 have a pair of diametrically spaced scallops 37 along the inner diameter thereof, as best seen in FIG. 4. Interposed between each pair of the plates 33 is a paper separator 38 having an entry port 39 and an eccentric cell channel 41 formed therein. In the construction of the B and C sections, the entry ports 39 of each paper separator 38 are registered with one of the scallops 37 of each of the plates such that, in the stack unit, the aforesaid scallops 37 and the open segment through the separator 38 are aligned to form the fill channel 32, which opens through the separator entry port 39 into each individual cell.

The last annular-shaped plate 42 which comprises the upper end of the B section and the beginning of the C section is formed with a connecting tab 43 in the scallop opposite the fill channel. The tab 43 is, after assembly of the stack, bent at a right angle thereto, to provide for connection to the appropriate terminal means 14, as by wire 44. This terminal, therefore, becomes the B— and the C+ terminal.

A connection may be made to the stack support 22 or the breaker platform 16, as the case may be, by any suitable means, not shown, to provide for the B+ terminal. The C— connection to the last plate in the C section is made in the same manner as the connection to plate 42 and has been illustrated, broken away on FIG. 3, for the sake of simplicity. It should be also understood that, if desired, any number of voltage taps may be taken along the B section in like manner as described.

The construction of the cells 26 making up the A section may be best understood by reference to FIGS. 5 and 6. Since the cells of the A section are parallel connected, alternate plates 45 are covered over their surface with a lead coating and the intermediate plates 46 are coated with lead dioxide. The paper separators 47 of the A section are similar to those in the B and C sections except the cell channel 48 formed therein is concentric as shown in FIG. 5 rather than the eccentric in configuration as in the B and C sections, FIG. 4.

The plates 45 and 46 of the A section are further provided with a leveling hole 49 to provide distribution of the electrolyte therein. Since the cells of this section above are parallel connected, no adverse voltage transients are produced by the intercommunication of the electrolyte within the cells.

Alternate plates 45 are provided with a tab 51 formed in the same manner as herein before described to provide for connection between these plates and to the appropriate terminal means 14. Likewise, intermediate plates 46 are provided with a tab 52 to provide for interconnection of the plates and the appropriate terminal.

An alternative embodiment of the ampule support means is illustrated in FIG. 7. An annular support spring 53 is utilized to support the ampule 18 above the breaker platform 16 in the same manner as herein before described with reference to the support disk 21 of FIG. 3.

In the construction of the battery or reserve energizer 11, the potting material or molding compound is formed in three operations. The stack is assembled as hereinbefore set forth and the outside molding is applied thereto. The stack is then pressed into the casing 13 and a mold in the shape of the ampule cavity 31 and fill channel 32 is inserted. Additional molding compound is now forced through the access hole 54 in the top of the battery casing 13. The mold is removed from the ampule cavity 31 and the molding compound 55 is placed at the lower inner end of the cell stack in the position shown in FIG. 3; the ampule 18 is inserted in the ampule cavity, and the breaker platform 16, together with the stack support disk 21 and the stack support 22 are put in place. The molding compound 55 between the stack support 22 and the casing 13 is then formed.

The entire unit is now pushed through a draw ring, the base member 15 is put in place, the casing 13 trimmed and turned over the edge of the base member 15 to form the completed unit.

The glass ampule 18 filled with a suitable electrolyte, such, for example, as fluoroboric acid is held within the ampule cavity by frictional contact between the friction contact means 19 and the ampule support disk 21. This friction is sufficient to maintain the ampule above the breaker platform 16, as shown in FIG. 3, during normal handling and shipping of the device. When the projectile 10 is fired, the setback forces due to the forward acceleration, are sufficient to move the ampule supporting disk 21 past the friction contact means 19, thereby allowing the ampule 18 to strike the impression 17 on the breaker platform 16 with sufficient force to break the ampule.

After the projectile leaves the muzzle of the gun, the deceleration of the projectile allows the electrolyte to flow along the fill channel 32 and the spin of the projectile forces the electrolyte through the entry ports 39 into the cells to activate the battery.

The reserve energizer, therefore, is filled, as viewed in FIG. 3, from the bottom of the stack upward, in successive order, except for some splash filling if the set-back forces are sufficient to give complete fragmentation of the ampule. The A section acts not only as a power source but also as a reservoir for the excess electrolyte occurring from the B and C section filling. In practice, it is desirable to carry the A section electrolyte level at about 50 percent of its capacity. Uniform distribution in the A section is obtained through the leveling holes in plates thereof.

Control of inner cell communication and retraction of the electrolyte from the entry port in the B and C sections is accomplished by the specific eccentric design of the paper separators illustrated. This design provides the necessary retraction for lowering the electrolyte level in the entry port of the individual cells and insures essentially uniform distribution of the electrolyte over the electrode area on off-center spins of the device up to .06 inch eccentricity.

There has been shown and described a battery or reserve energizer for a proximity fuze system or other electrical equipment contained within a projectile, which provides a new and unique arrangement of the energizer cells to insure more positive operation of the energizer when the set-back forces of the projectile are insufficient to give complete fragmentation of the electrolyte containing ampule and thereby no splash filling of the cells.

Obviously many modifications and variations of the present invention are possible in light of the above teachings. It is, therefore, to be understood, that within the scope of the appended claims, the invention may be practiced otherwise than as specifically described.

What is claimed and desired to be secured by Letters Patent of the United States is:

1. In a reserve energizer for use as a power source in a spin-type projectile and adapted for energization upon release of electrolyte from a frangible ampule when the latter is forced against a breaker at the bottom of said energizer, the improvement comprising: ampule support means, a plurality of annular-stacked plates surrounding said ampule, said plates including a first plurality of series connected cells forming the high voltage section of the energizer stacked at the bottom of said energizer, a second plurality of series connected cells forming the grid bias section of the energizer superimposed on and coaxial with said first plurality of cells along an intermediate portion of said energizer, and a third plurality of parallel connected cells forming the filament heater section of the energizer at the top of said energizer and superimposed on said second plurality of cells, an insulated cell reinforcing means interposed between and abutting said second plurality of series connected cells and said plurality of parallel connected cells, a plurality of annular paper separators each having an arcuate opening therein forming a cell channel, an electrolyte entry port connecting said cell channel to the inner annular surface of the separator, said separators each being disposed between each adjacent pair of said annular plates with the arcuate openings in the separators being eccentric to said inner annular surface of the separators between the annular plates forming said series connected cells and concentric with said inner annular surface between the annular plates forming said parallel connected cells whereby said electrolyte is uniformly distributed over the cell area on off-center spins of the projectile.

2. The energizer of claim 1 wherein said annular plates have a pair of flat surfaces and the inner annular edge of each of said annular plates has a scallop thereon, the entry port of each of said separators being registered with the scallops of each of the adjacent plates.

3. The energizer of claim 2 wherein one of the flat surfaces of said annular plates in said series connected cells is coated with lead and the other of said pair of surfaces is coated with lead dioxide.

4. The energizer of claim 3 wherein each alternate one of said annular plates in said parallel connected cells is coated on both the flat surfaces thereof with lead, and each intermediate one of said annular plates in said parallel connected cells is coated with lead dioxide.

5. The reserve energizer of claim 1 wherein said ampule support means includes a disc upon which the ampule is supported.

6. The reserve energizer of claim 1 wherein said ampule support means includes a spring upon which the ampule is supported.

7. The reserve energizer of claim 1 which further comprises an elastomeric molding compound encapsulating said cells and having an ampule cavity and a fill channel formed therein, said fill channel in said molding compound connecting the entry port in said separators to the ampule cavity in said molding whereby said cells may be filled with electrolyte when said ampule is broken.

8. The reserve energizer of claim 7 wherein said annular-shaped plates have an inner annular surface and a pair of diametrically spaced scallops formed along the inner annular surface, said separator entry port being registered with one of the scallops on each of said plates, and the scallop on said plates and the entry port on said separator being disposed along the fill-channel in said molding compound.

References Cited in the file of this patent

UNITED STATES PATENTS

| | | |
|---|---|---|
| 2,403,567 | Wales | July 9, 1946 |
| 2,534,056 | Pitt | Dec. 12, 1950 |
| 2,679,547 | Fischback et al. | May 25, 1954 |
| 2,927,145 | Burrell | Mar. 1, 1960 |
| 2,931,849 | Burrell | Apr. 5, 1960 |
| 2,981,778 | Freund | Apr. 25, 1961 |
| 2,981,779 | Freund | Apr. 25, 1961 |
| 2,985,702 | Darland et al. | May 23, 1961 |
| 3,003,016 | Marsal | Oct. 3, 1961 |

FOREIGN PATENTS

| | | |
|---|---|---|
| 1,091,667 | France | Nov. 3, 1954 |
| 1,233,509 | France | May 9, 1960 |